US010904250B2

(12) United States Patent
Larish

(10) Patent No.: US 10,904,250 B2
(45) Date of Patent: Jan. 26, 2021

(54) SYSTEMS AND METHODS FOR AUTOMATED NETWORK-BASED RULE GENERATION AND CONFIGURATION OF DIFFERENT NETWORK DEVICES

(71) Applicant: Verizon Patent and Licensing Inc., Arlington, VA (US)

(72) Inventor: Bryan Christopher Larish, Westfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 261 days.

(21) Appl. No.: 16/183,566

(22) Filed: Nov. 7, 2018

(65) Prior Publication Data

US 2020/0145417 A1 May 7, 2020

(51) Int. Cl.
*H04L 29/06* (2006.01)
*H04L 29/12* (2006.01)
*H04W 12/08* (2009.01)

(52) U.S. Cl.
CPC ...... *H04L 63/0876* (2013.01); *H04L 61/1511* (2013.01); *H04L 63/10* (2013.01); *H04L 63/20* (2013.01); *H04W 12/08* (2013.01)

(58) Field of Classification Search
CPC . H04L 63/02; H04L 63/0209; H04L 63/0218; H04L 63/0227; H04L 63/0236; H04L 63/10; H04L 63/101; H04L 63/104; H04L 63/20; H04L 61/1511; H04W 12/08
See application file for complete search history.

(56) References Cited

U.S. PATENT DOCUMENTS

| | | | | |
|---|---|---|---|---|
| 9,369,431 | B1* | 6/2016 | Kirby | H04L 63/0218 |
| 9,729,582 | B2* | 8/2017 | Loo | H04L 63/20 |
| 10,122,758 | B2* | 11/2018 | Nandakumar | H04W 12/0806 |
| 2009/0249440 | A1* | 10/2009 | Platt | H04L 63/20 726/1 |
| 2011/0078309 | A1* | 3/2011 | Bloch | H04L 63/0236 709/224 |
| 2014/0098674 | A1* | 4/2014 | Sonoda | H04L 45/64 370/238 |
| 2014/0189074 | A1* | 7/2014 | Parker | H04L 67/1002 709/220 |
| 2015/0215231 | A1* | 7/2015 | Liu | H04L 45/14 709/213 |
| 2016/0006693 | A1* | 1/2016 | Salcedo | H04L 63/0236 726/1 |

(Continued)

*Primary Examiner* — Khang Do

(57) ABSTRACT

Provided is a controller for configuring network devices at different network locations with rules that prevent different sets of clients from accessing specific network resources. The controller may receive a request with an identifier of a first resource from a particular network point of access. The controller may identify one or more network devices (e.g., wireless access point, router, switch, firewall, gateway, etc.) that are in the network path between the particular network point of access and the first resource. The controller may select a particular network device in the network path, may establish a connection to the particular network device, and may configure the particular network device with a rule that prevents access to the first resource from the particular network point of access, while permitting access to other resources from the particular network point of access.

20 Claims, 7 Drawing Sheets

(56) References Cited

U.S. PATENT DOCUMENTS

| | | | |
|---|---|---|---|
| 2016/0308905 A1* | 10/2016 | Stiekes | H04L 41/20 |
| 2016/0352731 A1* | 12/2016 | Mentze | H04L 63/0876 |
| 2017/0279689 A1* | 9/2017 | Mohan | H04L 45/38 |
| 2018/0026987 A1* | 1/2018 | Jayawardena | H04L 63/102 |
| | | | 726/7 |
| 2018/0084011 A1* | 3/2018 | Joseph | H04L 63/1425 |
| 2018/0152452 A1* | 5/2018 | Hu | H04L 67/12 |
| 2018/0285166 A1* | 10/2018 | Roy | G06F 11/3006 |
| 2018/0288002 A1* | 10/2018 | Petrick | H04L 41/0893 |
| 2018/0316676 A1* | 11/2018 | Gilpin | H04L 9/0891 |
| 2019/0253385 A1* | 8/2019 | Gurney | H04L 63/108 |

* cited by examiner

SYSTEMS AND METHODS FOR AUTOMATED NETWORK-BASED RULE GENERATION AND CONFIGURATION OF DIFFERENT NETWORK DEVICES

BACKGROUND

An individual, such as a parent, a supervisor of a workplace, etc., may desire to prevent access to certain network sites and/or network accessible content. In particular, the individual may want to restrict the access of employees, family members, and/or other users for security, business, privacy, parental control, and/or other reasons. Routers, firewalls, and/or other network devices may support manually configured rules that restrict access to different sites and/or particular specified items of content.

DETAILED DESCRIPTION OF PREFERRED EMBODIMENTS

Figure 1A:
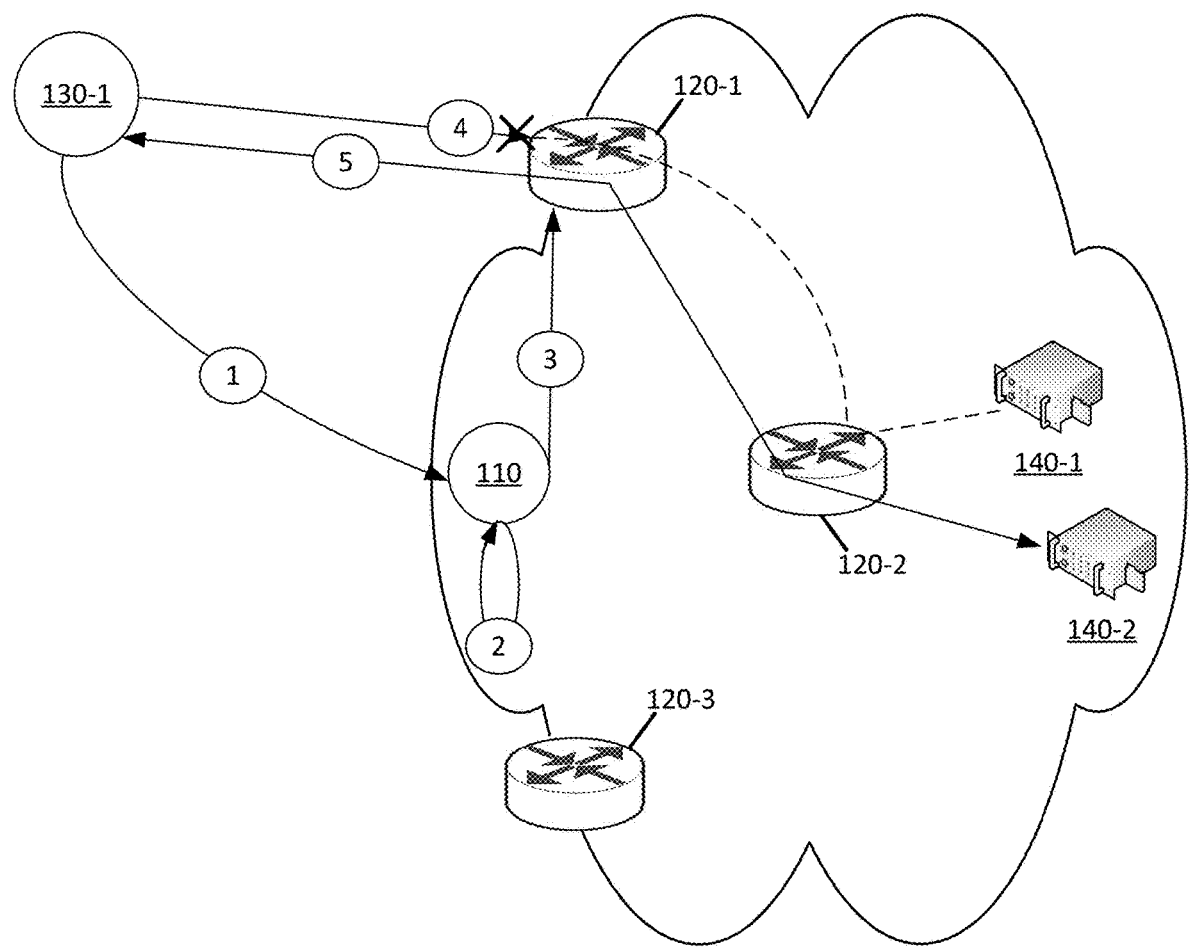
FIGS. 1A and 1B illustrate example operation for network-based rule generation and configuration of different network devices in accordance with some embodiments described herein.

The following detailed description refers to the accompanying drawings. The same reference numbers in different drawings may identify the same or similar elements.

Systems and/or methods, as described herein, provide a software-defined networking ("SDN") controller for automated network-based rule generation and configuration of different network devices. In some embodiments, a network, such as a wireless telecommunications network, may include one or more devices, such as distributed or "cloud" devices that may be configured to implement the SDN controller of some embodiments.

Users that receive network access from the network may access an interface and/or portal in order to request data access controls for sites and/or other network resources that are accessed from an external network, such as the Internet. The SDN controller may receive data access controls that can be used to restrict access (e.g., selectively restrict access, such as to particular web sites, types of content, resources, etc.) for an intended set of users and/or User Equipment ("UEs") from the interface and/or portal. The SDN controller may identify one or more network devices (e.g., wireless access point, router, switch, firewall, gateway, etc.) at a point of network access for the intended set of users, that are in the network path between the intended set of users and the external network, and/or that can enforce the data access controls for the intended set of users without affecting data access by other sets of users. The SDN controller may generate the rules that implement and/or enforce the data access controls, and/or may configure the one or more identified network devices in the network path between the intended set of users and the external network with the generated rules.

The SDN controller may automate the identification of different network devices for implementing data access controls for different sets of users, may automate the generation of rules for enforcing the data access controls, and/or may automate the configuration of different network devices for different sets of users desiring different data access controls for different sites and/or content without the users identifying and/or directly connecting to a network device, or the users manually configuring a network device. The network devices may include routers, network switches, firewalls, and/or other networking equipment that are distributed across the service provider network, and that provide different sets of users with different network paths to the external network.

By virtue of being an SDN component of the service provider network, the SDN controller can be dynamically provisioned on any dedicated or shared device to provide data access controls for different sets of users, and/or can be dynamically scaled across additional devices to configure more network devices as demand increases. For instance, additional instances of the SDN controller can execute from different dedicated and/or shared devices in order to provide data access controls for one or more subsets of users (e.g., users in specific service regions of the service provider network, users operating from specific geographic regions, etc.), and/or to configure different subsets of network devices within the service provider network (e.g., network devices in specific service regions of the service provider network, network devices located in specific geographic regions, etc.). Similarly, an instance of the SDN controller can be moved from a first device to a second device so that the SDN controller executes with additional computational resources that may be available on the second device and that may be unavailable on the first device. Users may use the same Uniform Resource Locator ("URL"), domain name, website, application, and/or other identifier to access the interface and/or portal, and to specify the data access controls, and the SDN controller, regardless of which device (or devices) implements the SDN controller, may automate the network device identification, rule generation, and network device configuration on behalf of the users.

In some embodiments, each SDN controller may provide the user interface and/or portal that users use to request the data access controls. In some such embodiments, Domain Name System ("DNS") resolution and/or other network routing may distribute different sets of users attempting to access the interface and/or portal to different SDN controllers. In some embodiments, a management server may provide the interface and/or portal for users to submit the data access control requests, and the management server may distribute the access control requests across the available and operational SDN controllers using one or more distribution schemes.

Figure 1B:
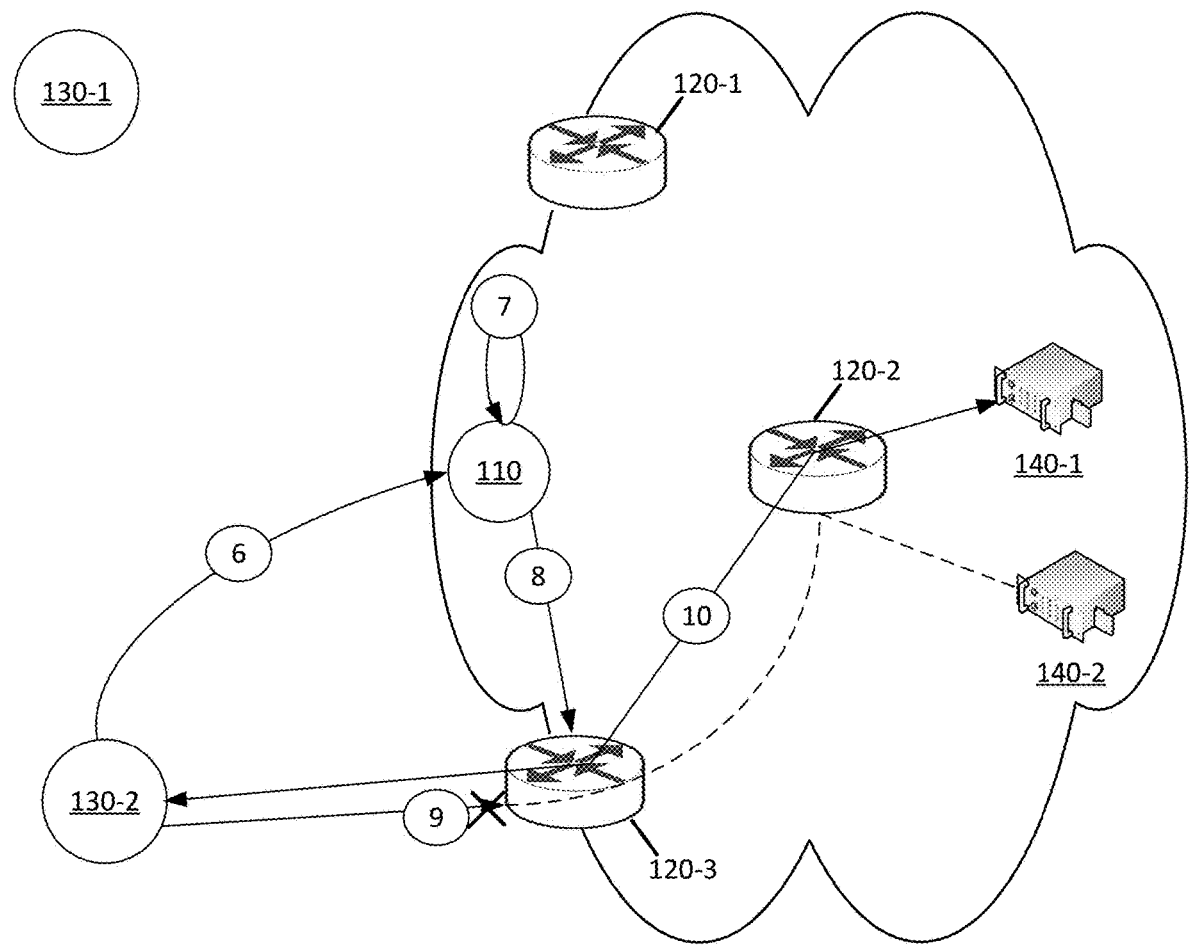

FIGS. 1A and 1B illustrate example operation for network-based rule generation and configuration of a network device by SDN controller 110 in accordance with some embodiments described herein. FIG. 1A includes SDN controller 110, network devices 120-1, 120-2, and 120-3 (herein sometimes collectively referred to as "network devices 120" or individually as "network device 120"), user equipment ("UE") 130-1, and sites 140-1 and 140-2 (herein sometimes collectively referred to as "sites 140" or individually as "site 140").

UE 130-1 may access an interface and/or portal in order to provide user input for desired data access controls, and SDN controller 110 may receive (at 1) the user input. The user input may identify one or more sites 140 and/or content to restrict. Sites 140 may include different network servers and/or network resources from which different UEs may access content, services, and/or data. In FIG. 1A, the user input may specify a domain name for site 140-1 in order to restrict access to site 140-1. In some embodiments, the user input may include additional parameters. The parameters may specify different times during which access to site 140-1 is blocked, different types of UEs (e.g., laptops, smartphones, and/or other UEs of different makes, models, sizes, and/or functionalities) that are prevented from accessing site 140-1, different types of content (e.g., content with different file extensions, sizes, encodings, etc.) that cannot be accessed from site 140-1, and/or other UE or content specific restrictions.

SDN controller 110 may determine an intended set of users and/or UEs that are subject to the site and/or content restrictions. In some embodiments, SDN controller 110 may determine the intended set of users and/or UEs based on a particular user account. For instance, when a user registers for network access from a point of access (e.g., home, office, and/or other location), the network service provider may create a user account for that user in a Home Subscriber Server ("HSS") or other subscriber and/or user management device of the network service provider. The user account may store network devices that provide network access at the point of access, identifying information for the UEs obtaining network access from the point of access (e.g., network addressing that is assigned to the UEs), access credentials used by one or more account users to gain network access, and/or data access controls for restricting access of account users and/or UEs to different sites 140. An account user may be a user that uses a specific login to obtain network access, that obtains network access from a particular network device that is registered to the user account and/or point of access, that is identified via one or more network addresses, and/or that is otherwise distinguished from users of other user accounts.

In FIG. 1A, UE 130-1 may access the interface and/or portal, log in to the particular user account, and/or define the data access controls for the particular user account. The particular user account may be linked to a particular point of network access within a service provider network. The particular point of network access may be an office and/or home location where the intended set of users and/or UEs obtain network access to resources of an external network (e.g., the Internet). Each point of network access may be linked to one or more network devices. In FIG. 1A, the particular point of network access for the particular user account accessed by UE 130-1 may be linked to network device 120-1. Network device 120-1 may be a router, network switch, modem, and/or other networking equipment that UE 130-1 and other UEs in a home or office use for network access to sites 140. Accordingly, SDN controller 110 may select network device 120-1 (e.g., from the set of network devices that includes network devices 120-1, 120-2, and 120-3) to implement and enforce the data access controls requested by UE 130-1.

SDN controller 110 may define (at 2) one or more rules to implement the user requested data access controls (e.g., restrict access to site 140-1) on network device 120-1. As part of defining the rules, SDN controller 110 may issue a DNS query to resolve a domain name that is provided for site 140-1 in the user input into a network address. SDN controller 110 may define the rules based on the resolved network address of site 140-1. For instance, SDN controller 110 may define a rule to block requests (e.g., DNS requests, Hypertext Transfer Protocol ("HTTP") GET or POST requests, transmission on specific ports, etc.) to the resolved network address of site 140-1, rather than a rule to block requests to the domain name of site 140-1. SDN controller 110 may define a rule using the resolved network address of site 140-1 to prevent users from circumventing rules that are defined based on the domain name that resolves to the network address of site 140-1. For instance, if the rule is defined based on the domain name that resolves to the network address of site 140-1, a user may circumvent the rule by simply issuing requests that are directed to the resolved network address instead of the domain name. No such rule circumvention may be possible when SDN controller 110 defines the rules using the resolved network addressing of a restricted site. In some embodiments, SDN controller 110 may define the rule using other characteristics that identify user access to the desired network resources. The identifying characteristics may be found in a UE submitted request and/or in the content that a site 140 returns in response to a UE submitted request. For instance, the rule may specify a header signature (e.g., one or more header parameters that are used to access a site and/or that are included with the site content), query string arguments, port numbers, communication protocols, keywords, links, and/or other data in the site content, and/or other network resource identifying characteristics. SDN controller 110 may periodically access the network resource to determine the current state of these identifying characteristics as the characteristics may change over time.

In some embodiments, SDN controller 110 periodically issues DNS requests to resolve the domain names of restricted sites into network addresses. Periodic DNS resolution requests are useful to handle the situation where a network address for a restricted site changes over time. In some embodiments, SDN controller 110 periodically receives "blacklisted" network addresses from a security source that may indicate network addresses that have exhibited suspicious activity (e.g., phishing sites, malware sources, etc.).

SDN controller 110 may configure (at 3) network device 120-1 with the one or more rules. SDN controller 110 may configure (at 3) network device 120-1 by obtaining a network address of network device 120-1 from the particular user account that was used to request the data access controls, by using a master login and/or other access credentials to remotely access network device 120-1 at the network address, and/or by providing a file (e.g., text file, extensible markup language ("XML") file, or other file) to configure network device 120-1 with the rule. In some embodiments, SDN controller 110 may have an established connection with network device 120-1. For instance, network device 120-1 may be configured with a network address, domain name, and/or other identifier that can be used to establish a connection with SDN controller 110 when network device 120-1 is operational. SDN controller 110 may use the established connection to issue commands and/or instructions to configure network device 120-1 with the rule. Communications with network device 120-1 may be according to various protocols that support SDN capabilities, such as OpenFlow.

Although not shown in FIG. 1, SDN controller 110 may also configure network device 120-2 with the rule in addition to, or instead of, configuring network device 120-1 with the rule. SDN controller 110 may detect that network device 120-2 is in the network path between the intended set of users subject to the data access controls (e.g., UE 130-1) and site 140-1. For instance, network device 120-1 may be a customer termination router, and network device 120-2 may be a gateway router. The gateway router may provide users, that receive network access from network device 120-1, with access to sites 140-1, 140-2, and/or other sites or content in an external network. Accordingly, SDN controller 110 may configure the gateway router (e.g., network device 120-2) to also enforce the data access controls for the intended set of users.

In some embodiments, SDN controller 110 may select one of several network devices 120 to configure with a data access control rule based on the rules and/or functionality supported by network devices 120. For instance, the user input may provide a time-of-day restriction for restricting access to site 140-1 to a particular time period of the day. Network device 120-1 may not support time-of-day restrictions, whereas network device 120-2 may support time-of-day restrictions. Accordingly, SDN controller 110 may configure network device 120-2 with the data access control rule and time-of-day restriction, and network device 120-2 may enforce the data access controls during the time-of-day restrictions.

After SDN controller 110 configures (at 3) the rule on network device 120-1, network device 120-1 may block (at 4) some or all traffic that is intended for site 140-1. In particular, one or more UEs 130-1 in a home or office may use network device 120-1 for external network access, and network device 120-1 may inspect requests and/or messages from UEs 130-1 in order to detect and block requests and/or messages to site 140-1 that violate the rule that was configured (at 3) by SDN controller 110. In this figure, network device 120-1, based on the configured rule, may block (at 4) requests and/or messages with a destination address (and/or other identifying characteristics) that matches the network address (and/or other identifying characteristics) of site 140-1. In FIGS. 1A and 1*n* the other figures, the restricted access and/or blocking of requests and/or messaging is illustrated by the "X" marker followed by dashed lines. Network device 120-1 may route requests and/or messages for other sites or content. For instance, UEs 130-1 may request (at 5) and receive content from site 140-2 via network device 120-1. In some embodiments, network device 120-1, based on the configured rule, may permit requests and/or messages from UEs 130-1 to route to site 140-1, and may block and/or drop response data that site 140-1 provides to UEs 130-1 before the response data reaches UEs 130-1.

FIG. 1B illustrates second UE 130-2 submitting a data access control request. In particular, UE 130-2 may access the data access control submission interface and/or portal, and may log in to a second user account that is different than the user account used by UE 130-1 to specify the access control restrictions that are enforced in FIG. 1A. UE 130-2 may request that access to site 140-2 be restricted by specifying a domain name of site 140-2. SDN controller 110 may receive (at 6) the data access control request submitted by UE 130-2.

SDN controller 110 may determine that a different intended set of users are subject to the site and/or content restrictions requested by UE 130-2, based on UE 130-2 submitting the data access control request via the second user account. The second user account may be linked to a second point of network access within the service provider network, and network device 120-2 may be a registered device that is linked to the second user account and/or that provides network access to UEs 130-2 at the second point of network access. Accordingly, SDN controller 110 may select network device 120-2 to implement and enforce the data access controls requested by UE 130-2.

SDN controller may generate (at 7) one or more rules to implement the data access controls (e.g., restrict access to site 140-2) requested by UE 130-2 on network device 120-2, and may configure (at 8) network device 120-2 with the one or more rules. Thereafter, network device 120-2 may block (at 9) some or all traffic that originates from the second point of network access and that is intended for site 140-2, while routing (at 10) other traffic that originates from the second point of network access and that is intended other sites (e.g., site 140-1) or content.

In some embodiments, the network service provider may provide two or more SDN controllers 110 for distributed configuration of network devices 120. Two or more SDN controllers 110 may be used to distribute the configuration load when the number of configurable network devices 120 or the number of users exceeds one or more thresholds. Two or more SDN controllers 110 may be used when the service provider's network has different service regions in different geographic regions and a different SDN controller 110 is used to configure network devices in each service region. For instance, a first SDN controller 110 may configure network devices 120 of a first set of users and/or network devices 120 that are in a first geographic region or service region, and a second SDN controller 110 may configure network devices 120 of a different second set of users and/or network devices 120 that are in a different second geographic region or service region. In some such embodiments, users may continue to access single interface and/or portal in order to request the data access controls. SDN controllers 110 may receive the user input based on where the requests originate from, the particular user account used to request the data access controls, the location of the implicated network devices 120, and/or other factors.

Figure 2:
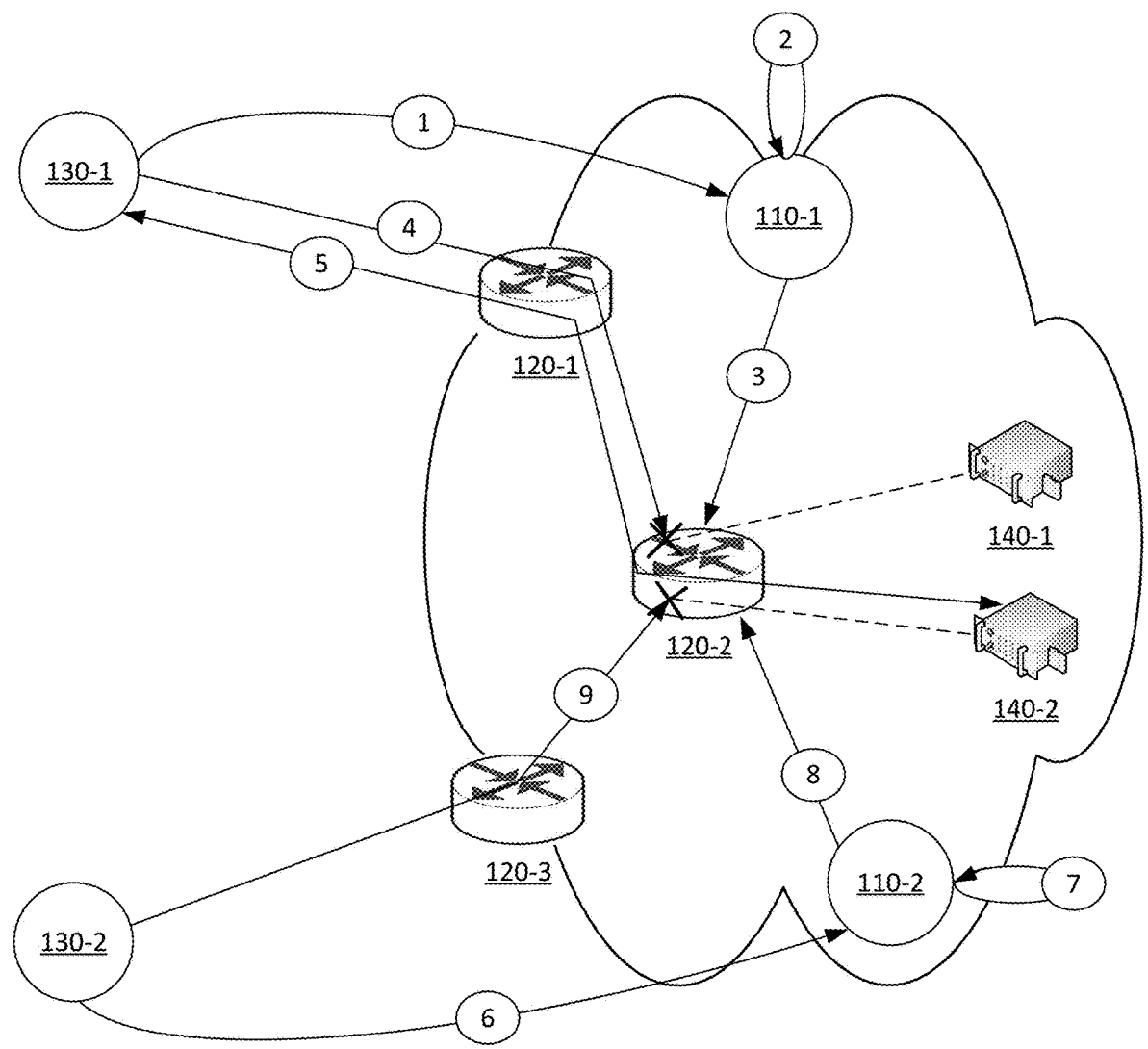
FIG. 2 illustrates an example of multiple software-defined networking ("SDN") controllers automatically configuring a network device to restrict different sets of users' access to different sets of sites in accordance with some embodiments described herein.

FIG. 2 illustrates an example of multiple SDN controllers 110 automatically configuring network device 120-2 to restrict different sets of users' access to different sets of sites 140 in accordance with some embodiments described herein. FIG. 2 includes SDN controllers 110-1 and 110-2 (herein sometimes collectively referred to as "SDN controllers 110" or individually as "SDN controller 110"), network devices 120-1, 120-2, and 120-3, UEs 130-1 and 130-2 (herein sometimes collectively referred to as "UE 130" or individually as "UE 130"), and sites 140-1 and 140-2.

SDN controllers 110-1 and 110-2 may operate in different parts of a service provider network (e.g., different geographical regions), and may configure access restrictions for different sets of users that operate from the different parts of the service provider network. For instance, UE 130-1 may be linked to a first user account for network access provided to a home or office at a first part of the service provider network, and UE 130-2 may be linked to a second user account for network access provided by radio access networks ("RANs") of a wireless telecommunications network at a second part of the service provider network.

SDN controller 110-1 may receive (at 1) a first set of user input that is provided by UE 130-1. The first set of user input may include a request for a data access control to restrict access to site 140-1, and a domain name of site 140-1.

SDN controller 110-1 may resolve the domain name to one or more specific network addresses or other identifying characteristics, and/or may generate (at 2) one or more rules to restrict a first set of intended users (e.g., UE 130-1) from accessing site 140-1. SDN controller 110-1 may generate (at 2) the rule to include the network addresses and/or other identifiers of the first set of intended users so that the rule is enforced against the first set of intended users and not other sets of users. In FIG. 2, the first set of intended users may be users that operate in the same service region as UE 130-1, and therefore may use the same or a particular set of network addresses when communicating with sites 140 in the external network. That is, in some embodiments, distinct service regions may be associated with distinct sets of network addresses, whereby a given network address for a given UE 130 may serve to reliably indicate in which service region the given UE 130 is located.

SDN controller 110-1 may configure (at 3) network device 120-2 with the generated rule. Thereafter, subsequent requests and/or messages for accessing site 140-1 and/or content of site 140-1 issued by UE 130-1 and/or other users in the first set of intended users may be blocked (at 4) by network device 120-2. Network device 120-2 may route (at 5) other requests and/or messages for accessing other sites or content (e.g., site 140-2) from UE 130-1 and/or the first set of intended users.

FIG. 2 also illustrates SDN controller 110-2 receiving (at 6) a second set of user input from UE 130-2. UE 130-2 may provide the second set of user input using a different user account than was used by UE 130-1 to provide the first set of user input. The second set of user input may include a request to restrict a second set of intended users (e.g., UE 130-2) from accessing site 140-2. The request may include identifying information of site 140-2 (e.g., a domain name of site 140-2).

SDN controller 110-2 may generate (at 7) a second rule to enforce the data access controls for the second set of intended users. For instance, SDN controller 110-2 may generate (at 7) the second rule with source network addressing and/or other identifiers of the second set of intended users (e.g., UE 130-2) so that the second rule is enforced against the second set of intended users and not other sets of users (e.g., the first set of intended users). In FIG. 2, the second set of intended users may include UEs 130-2 that communicate via one or more RANs of the service provider network.

SDN controller 110-2 may configure (at 8) the second rule at network device 120-2. Network device 120-2 may receive a request and/or message from UE 130-2. Network device 120-2 may determine the network address of UE 130-2 (e.g., from a header of the request and/or message), and may further determine that the request and/or message is intended for site 140-2. Consequently, the request and/or message violates the data access control rule configured by SDN controller 110-2, and network device 120-2 may block (at 9) the request and/or message as a result, even though requests and/or messages from UE 130-1 to site 140-2 are routed (at 5) through network device 120-2 (i.e., are not blocked).

In some embodiments, SDN controller 110 may select and configure different network devices in a network path between a set of users and a restricted site 140 based on the ability of different network devices to support access restrictions, rules, and/or various parameters of a rule (e.g., time-of-day restrictions), and/or available resources or computational power of the network devices. For instance, in FIG. 2, SDN controller 110-1 may select and configure (at 3) network device 120-2, instead of network device 120-1, when network device 120-1 does not support the generated data access control rule and/or various parameters of the rule. In some embodiments, SDN controller 110 may also select and configure different network devices in a network path between a set of users and a restricted site 140 when a rule can be configured and enforced from a common intersection point in the network rather than multiple different points that lead to the common intersection point. For instance, an office may deploy multiple customer termination routers (e.g., different instances of network device 120-1). The customer termination routers may each route to a common gateway router (e.g., network device 120-2) when accessing sites and/or content from an external network. In this case, SDN controller 110-1 may configure the gateway router (e.g., network device 120-2) with the data access control rule, and the gateway router may enforce the data access control rule for all users regardless of the customer termination router (e.g., different instances of network device 120-1) that routes the traffic to the gateway router.

Figure 3:
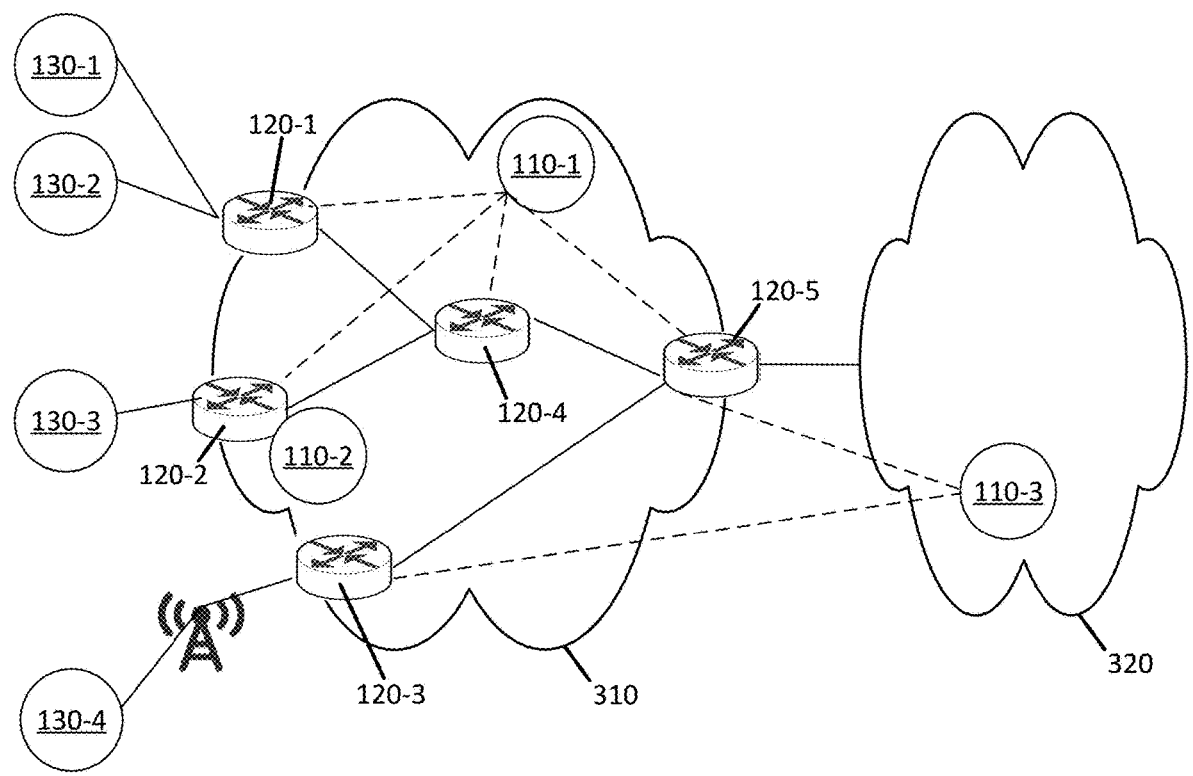
FIG. 3 conceptually illustrates different possible deployment options for the SDN controller in accordance with some embodiments described herein.

As noted above, SDN controller 110 may be able to be implemented by a one or more devices (e.g., cloud computing devices or resources) within and/or outside the service provider network. FIG. 3 conceptually illustrates different possible deployment options for SDN 110 controller in accordance with some embodiments described herein.

FIG. 3 includes service provider network 310 and an external network 320. UEs 130-1, 130-2, 130-3, and 130-4 may access sites and/or content from external network 320 via network connectivity and/or routing provided by one or more network devices 120-1, 120-2, 120-3, 120-4, and 120-5 of service provider network 310. Service provider network 310 may represent one or more service regions from which different sets of users may access external network 320.

SDN controller 110-1 may be implemented within service provider network 310, and may configure data access controls on a first set of network devices 120-1, 120-2, 120-4, and/or 120-5 for a first set of users. SDN controller 110-2 may also be implemented within service provider network 310. Specifically, SDN controller 110-2 may be directly implemented on network device 120-2 (e.g., on a same set of physical or virtual resources), and may configure data access controls on network device 120-2 for a second set of users that receive network access through network device 120-2. SDN controller 110-3 may be implemented outside of service provider network 310. For instance, SDN controller 110-3 may be implemented on a device in external network 320, and may configure data access controls on a second set of network devices 120-3 and 120-5 for a third set of users.

In some embodiments, the partitioned configuration of different sets of network devices 120 by different SDN controllers 110 is based on a distribution of data access control requests to SDN controllers 110. Accordingly, in some other embodiments, any SDN controller 110 may configure any network device 120 based on a different distribution of user submitted data access control requests across SDN controllers 110. For instance, SDN controller 110-1 may receive a data access control request that was submitted by a user of UE 130-4. SDN controller 110-1 may generate the rule to implement the requested data access control, and may configure the rule on network device 120-3 from which UE 130-4 and a set of intended users subject to the data access control receive network access. The distribution of data access control requests from the interface and/or portal to SDN controllers 110 may therefore be based on a simple round-robin distribution scheme or a more targeted and/or persistent distribution scheme.

In some embodiments, SDN controllers 110 may be implemented on a dedicated device or a shared device that performs other functions in addition to or instead of the data access control rule configuration performed by SDN controller 110. For instance, SDN controller 110-1 illustrated in FIG. 3 may be implemented on a dedicated device, whereas SDN controller 110-2 illustrated in FIG. 3 may be implemented on a shared device that also provides routing functionality for network device 120-2. On a shared device, SDN controller 110 may execute as a virtual machine that operates with a partitioned set of resources of the underlying physical device. Alternatively, SDN controller 110 may be integrated into the software stack of the shared device.

The different implementations provide a scalable SDN controller 110 that can be provided with additional resource as demand for data access controls increases or as the network footprint (e.g., user base) grows. Moreover, SDN controller 110 can be deployed and run from any device with minimal configuration overhead, thereby allowing a network administrator to reuse existing devices and/or resources for data access control configuration.

Figure 4:
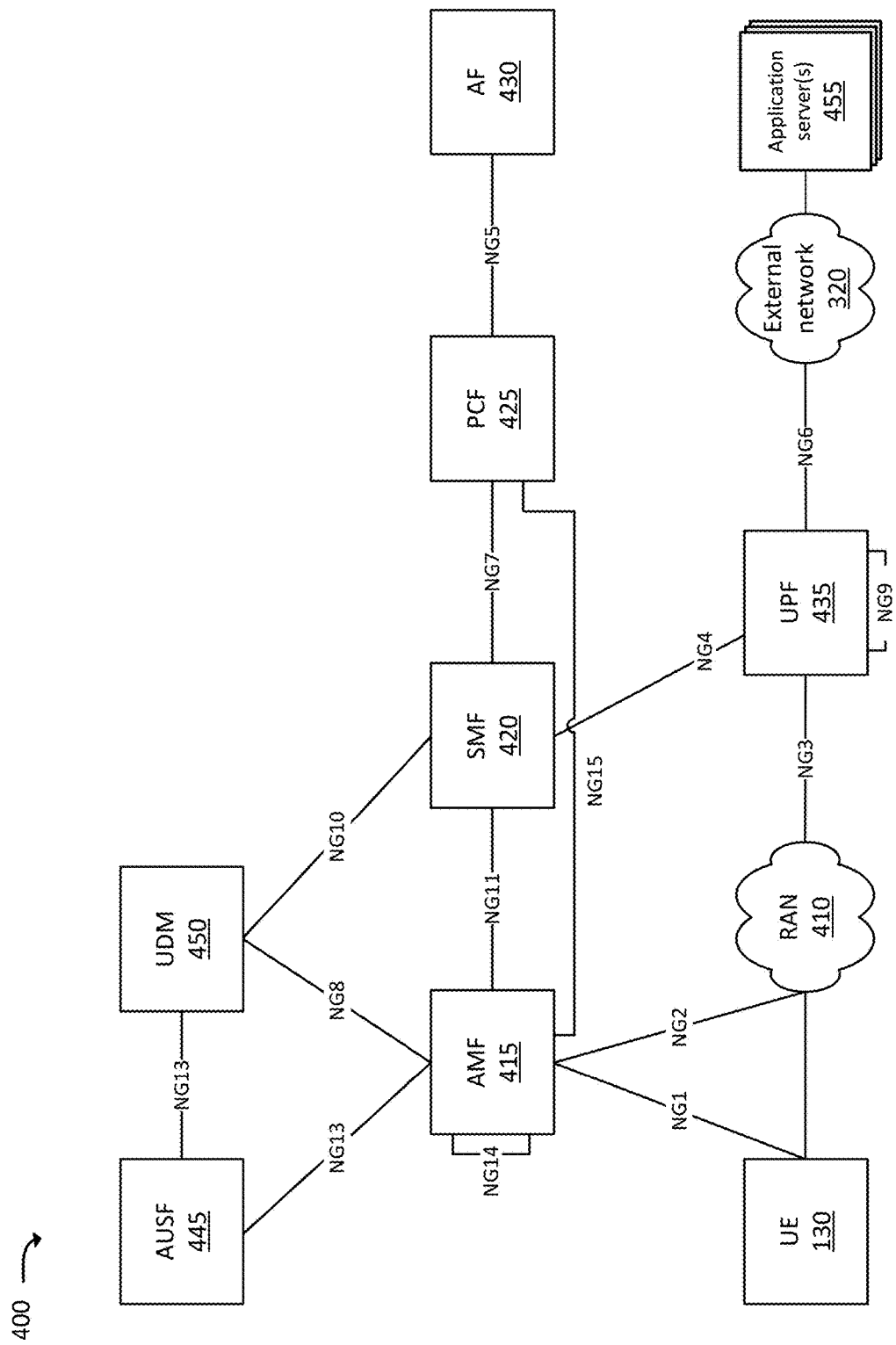
FIG. 4 illustrates an example environment, in which systems and/or methods described herein may be implemented.

FIG. 4 illustrates example environment 400, in which systems and/or methods described herein may be implemented. As shown in FIG. 4, environment 400 may include UE 130, RAN 410, Access and Mobility Management Function ("AMF") 415, Session Management Function ("SMF") 420, Policy Control Function ("PCF") 425, Application Function ("AF") 430, User Plane Function ("UPF") 435, external network 320, Authentication Server Function ("AUSF") 445, Unified Data Management ("UDM") 450, and application server 455.

SDN controller 110 may be implemented and may execute from dedicated and/or shared devices within RAN 410, AMF 415, SMF 420, PCF 425, AF 430, UPF 435, dedicated and/or shared devices within external network 320, AUSF 445, UDM 450, and application server 455. Environment 400 may correspond to a Fifth Generation ("5G") network, and/or may include elements of a 5G network. SDN controller 110 may also be implemented and may also execute from devices of other networks including, for example, a Fourth Generation ("4G") network, a Long Term Evolution ("LTE") network, a Third Generation ("3G") network, a public land mobile network ("PLMN"), and/or another network.

The quantity of devices and/or networks, illustrated in FIG. 4, is provided for explanatory purposes only. In practice, environment 400 may include additional devices and/or networks; fewer devices and/or networks; different devices and/or networks; or differently arranged devices and/or networks than illustrated in FIG. 4. For example, while not shown, environment 400 may include devices that facilitate or enable communication between various components shown in environment 400, such as routers, modems, gateways, switches, hubs, etc. Alternatively, or additionally, one or more of the devices of environment 400 may perform one or more functions described as being performed by another one or more of the devices of environments 400. Devices of environment 400 may interconnect with each other and/or other devices via wired connections, wireless connections, or a combination of wired and wireless connections. In some implementations, one or more devices of environment 400 may be physically integrated in, and/or may be physically attached to, one or more other devices of environment 400.

While "direct" connections are shown in FIG. 4 between certain devices, some devices may communicate with each other via one or more intermediary devices (e.g., routers, switch, hubs, etc.) or networks (e.g., an Ethernet backhaul network ("EBH") and/or some other type of network). Furthermore, some of the connections shown in FIG. 4 may be logical connections, and may represent the communication between different logical portions of a single device. Further, in some implementations, some devices, shown in FIG. 4, may communicate with each other even though connections are not shown between such devices in the figure.

UE 130 may include a computation and communication device, such as a wireless mobile communication device that is capable of communicating with RAN 410 and/or external network 320. UE 130 may be, or may include, a radiotelephone; a personal communications system ("PCS") terminal (e.g., a device that combines a cellular radiotelephone with data processing and data communications capabilities); a personal digital assistant ("PDA") (e.g., a device that may include a radiotelephone, a pager, Internet/intranet access, etc.); a smart phone; a laptop computer; a tablet computer; a camera; a personal gaming system; an Internet-of-Things ("IoT") device (e.g., a sensor, a smart home appliance, or the like); or another type of mobile computation and communication device. UE 130 may send traffic to and/or receive traffic from different sites in external network 320 via RAN 410.

RAN 410 may be, or may include, a 5G RAN that includes one or more base stations, via which UE 130 may communicate with one or more other elements of environment 400. UE 130 may communicate with RAN 410 via an air interface. For instance, RAN 410 may receive traffic (e.g., voice call traffic, data traffic, messaging traffic, signaling traffic, etc.) from UE 130 via the air interface, and may communicate the traffic to UPF 435, and/or one or more other devices or networks. Similarly, RAN 410 may receive traffic intended for UE 130 (e.g., from UPF 435, and/or one or more other devices or networks) and may communicate the traffic to UE 130 via the air interface.

AMF 415 may include one or more computation and communication devices that perform operations to register UE 130 with the 5G network, to establish bearer channels associated with UE 130, to hand off UE 130 from the 5G network to another network, to hand off UE 130 from the other network to the 5G network, and/or to perform other operations. In some embodiments, the 5G network may include multiple AMFs 415, which communicate with each other via the NG14 interface (denoted in FIG. 4 by the line marked "NG14" originating and terminating at AMF 415).

SMF 420 may include one or more network devices that gather, process, store, and/or provide information in a manner described herein. SMF 420 may, for example, facilitate in the establishment of communication sessions on behalf of UE 130. In some embodiments, the establishment of communications sessions may be performed in accordance with one or more policies provided by PCF 425.

PCF 425 may include one or more devices that aggregate information to and from the 5G network and/or other sources. PCF 425 may receive information regarding policies and/or subscriptions from one or more sources, such as subscriber databases and/or from one or more users (such as, for example, an administrator associated with PCF 425).

AF 430 may include one or more devices that receive, store, and/or provide information that may be used in determining parameters (e.g., quality of service parameters, charging parameters, or the like) for certain applications.

UPF 435 may include one or more devices that receive, store, and/or provide data (e.g., user plane data). For example, UPF 435 may receive user plane data (e.g., voice call traffic, data traffic, etc.), destined for UE 130, from external network 320, and may forward the user plane data toward UE 130 (e.g., via RAN 410, SMF 420, and/or one or more other devices). In some embodiments, multiple UPFs 435 may be deployed (e.g., in different geographical locations), and the delivery of content to UE 130 may be coordinated via the NG9 interface (e.g., as denoted in FIG. 4 by the line marked "NG9" originating and terminating at UPF 435). Similarly, UPF 435 may receive traffic from UE 130 (e.g., via RAN 410, SMF 420, and/or one or more other devices), and may forward the traffic toward external network 320. In some embodiments, UPF 435 may communicate (e.g., via the NG4 interface) with SMF 420, regarding user plane data processed by UPF 435. This information may aid SMF 420 in monitoring (e.g., tracking, counting, etc.) the traffic for particular subscribers.

External network 320 may include one or more wired and/or wireless networks. For example, external network 320 may include an IP-based packet data network, a Wide Area Network ("WAN") such as the Internet, a private enterprise network, and/or one or more other networks. External network 320 may represent a data network from which users in service regions of a particular service provider access different sites and/or content.

UE 130 may communicate, through external network 320, with data servers, application servers 455, other UEs 130, and/or to other servers or applications that are coupled to external network 320. External network 320 may be connected to one or more other networks, such as a public switched telephone network ("PSTN"), PLMN, and/or another network. External network 320 may be connected to one or more devices, such as content providers, applications, web servers, and/or other devices, with which UE 130 may communicate.

Application servers 455 may include one or more devices (e.g., a device and/or a collection of devices) that communicate with UE 130. For example, application servers 455 may implement an application related to the function of UE 130. Additionally, or alternatively, application servers 455 may implement an application that communicates with an application executed by UE 130. Application servers 455 may represent shared devices of within a service provider network that provide a variety of functionality to UEs 130, users, and/or other elements of the service provider network.

AUSF 445 and UDM 450 may include one or more devices that manage, update, and/or store, in one or more memory devices associated with AUSF 445 and/or UDM 450, profile information associated with a subscriber. AUSF 445 and/or UDM 450 may perform authentication, authorization, and/or accounting operations associated with the subscriber and/or a communication session with UE 130.

As noted above, one or more SDN controllers 110 may execute from any dedicated device or shared device of environment 400 (e.g., a 5G network), a 4G network, an LTE network, a 3G network, external network 320, and/or other network. For instance, SDN controller 110 may be implemented on and/or may execute from one or more application servers 455 that provide configurable shared resources. In some embodiments, it may be advantageous to implement SDN controller 110 on other devices of environment 400.

In some embodiments, it may be advantageous to implement and/or execute SDN controller 110 from PCF 425. For instance, SDN controller 110 may obtain and/or query PCF 425 for subscriber information about a user that submits a data access control request for access restrictions. The subscriber information may include information as to a network device 120 at the user premises (e.g., user home or office), and/or that the user and/or a set of intended users subject to the data access controls use to access different sites and/or content. In particular, the subscriber information may specify a make and model of network device 120 at the user premises. SDN controller 110 may determine rules that are supported by network device 120 based on the subscriber information. The subscriber information may also provide a network address for connecting to and communicating with network device 120 at the user premises.

As another example, it may be advantageous to implement and/or execute SDN controller 110 from AUSF 445 and/or UDM 450. AUSF 445 and/or UDM 450 may store profile information about a user. SDN controller 110 may obtain and/or query AUSF 445 and/or UDM 450 for the profile information, and may use the profile information in order to identify a network device 120 at the user premises of a user requesting data access controls, and/or that provides different sets of users with network access. The profile information may also provide information by which SDN controller 110 may access and/or configure network device 120 at the user premises.

Figure 5:
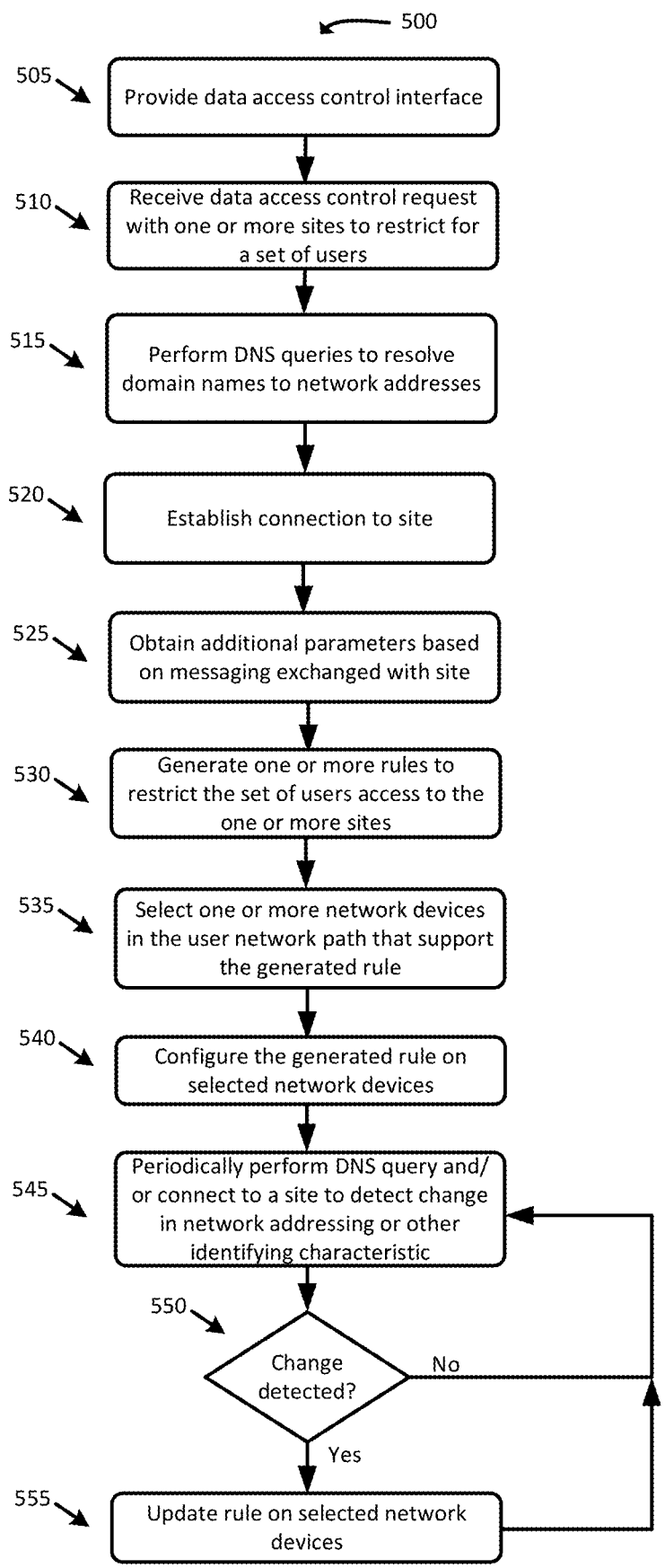
FIG. 5 presents an example process for automated rule generation and configuration of a network device in accordance with some embodiments described herein.

FIG. 5 presents example process 500 for automated rule generation and configuration of a network device in accordance with some embodiments described herein. Process 500 may be performed by one or more SDN controllers 110.

Process 500 may include providing (at 505) a data access control interface. The data access control interface may be a graphical user interface, a command line interface, a portal, and/or another interactive tool with which users can request different data access controls. One or more SDN controllers 110 may generate the data access control interface. The data access control interface may be a website, application, and/or service that users can remotely access using their UEs. The data access control interface may be accessed via a URL or domain name that identifies, via DNS resolution, an SDN controller 110 that is closest to a requesting UE. In some embodiments, the data access control interface may be accessed from a management server of a service provider, and the management server may distribute the data access control requests of different users to different SDN controllers 110.

A user may submit, using UE 130, an access control request to SDN controller 110 via the access control interface. The user may direct a web browser or other application executing on UE 130 to the URL, domain name, and/or other identifier that is used to access the access control interface. The user may provide credentials (e.g., username and password) that authenticate the user, and that enable access to a particular user account that is linked to the user's credentials. SDN controller 110 may provide the credentials to another device in environment 400 in order to authenticate the user and/or access the particular user account. For instance, SDN controller 110 may exchange data with PCF 435, AUSF 445, and UDM 450 in order to authenticate the user and/or access the particular user account.

Process 500 may include receiving (at 510) a data access control request that the user submits using the data access control interface. The data access control request may be a request to restrict access of the particular user accounts and/or a set of users associated with the particular user account to one or more sites and/or content. The access control request may include fully qualified domain names ("FQDNs"), URLs, and/or other identifiers for accessing the one or more sites. In some embodiments, the access control request may include a selection of one or more categories instead of the FQDNs, URLs, and/or other identifiers. Each category may be linked one or more sites. For instance, the access control request may specify restricting access to social media and adult video content. SDN controller 110 may link different sets of sites to each of the social media and adult video categories. In some embodiments, the access control request may also include information in addition to a list of restricted sites. For instance, the input may provide time-of-day restrictions and/or other conditions to limit the access restrictions to specific device types, types of content, subdomains, etc.

SDN controller 110 may then derive one or more rules based on the access control request. In particular, SDN controller 110 may derive rules that are not easily circumvented, and that apply to an intended set of users and not other users.

Accordingly, process 500 may include performing (at 515) one or more DNS queries to resolve domain names of the restricted sites and/or content into network addresses for the corresponding sites and/or content. Some sites might be accessed using the same network address as other sites and/or content. For instance, different content provider sites may be hosted and accessed from a single Internet Protocol ("IP") address of a content delivery network ("CDN"). Similarly, the user may request that a first subset of content (e.g., video content) from a site be blocked, while a different second subset of content (e.g., webpages) from the same site remains accessible.

To ensure that only the user identified sites and/or content are blocked, SDN controller 110 may obtain additional information for the identified sites and/or content in some embodiments. The additional information may be obtained by establishing (at 520) a connection and/or requesting initial data from a restricted site, and obtaining (at 525) additional parameters for differentiating the restricted site and/or content from other sites and/or content in response. For instance, SDN controller 110 may establish a Transmission Control Protocol ("TCP") connection with a restricted site (e.g., a site identified at 510), and may request restricted content in order to identify a port number that is used in accessing the restricted site and/or the restricted content. SDN controller 110 may identify other information in the header and/or payload of the packets exchanged with the restricted site that can be used to differentiate the restricted site or restricted content from other sites or other content that may be accessed using the same network address. In some embodiments, SDN controller 110 may use artificial intelligence and/or machine learning to determine a site signature, via a pattern of identifiers in a packet header and/or payload, that can be used to differentiate sites and/or content that may be accessed using the same network address, URL, and/or other request parameter.

In some embodiments, SDN controller 110 may forgo establishing (at 520) a connection to a restricted site and/or obtaining (at 525) the additional parameters when sufficient information may be obtained from performing (at 520) the DNS queries to generate the data access control rules, and/or when the data access control request from the user can be satisfied without the additional parameters.

Process 500 may include generating (at 530) one or more rules to restrict the set of users access to the one or more sites and/or content identified in the access control request. The rules may be defined as instructions and/or commands that can be used to configure network devices with data access controls. Generating the rules may therefore include converting user provided input (e.g., domain names) into the configuration instructions and/or commands. In some embodiments, SDN controller 110 may support the instruction and/or command set of different network devices (e.g., routers, switches, gateways, etc. of different makes, models, and/or manufacturers) that may be deployed throughout the network. In some embodiments, SDN controller 110 may use information obtained from performing (at 515) the DNS queries, establishing (at 520) connections to the restricted sites, and/or obtaining (at 525) additional parameters based on exchanged messages with the restricted sites in order to generate the rules. For instance, SDN controller 110 may generate (at 530) one or more rules to restrict access to a specific network address of a site rather than a domain name that resolves to the specific network address and that is provided with the access control request. In some embodiments, SDN controller 110 may also generate (at 530) one or more rules with time-of-day restrictions and/or other conditions as to when or how the rules are enforced when such restrictions and/or conditions are specified as part of the access control request. SDN controller 110 may ensure that the one or more rules are applied for an intended set of users and do not restrict other sets of users by defining the one or more rules with source network addressing and/or other identifiers (e.g., device type, unique header signature, etc.) for the intended set of users.

Process 500 may include selecting (at 535) one or more network devices 120 in the user network path that support the generated one or more rules. In some embodiments, SDN controller 110 may select from network devices 120 that are listed in the user account. For instance, a service provider may provide and/or register a customer termination router or switch at the point of network access (e.g., home or office) of each subscribing user. The network address of the customer termination router or switch may be stored as part of the user account. Accordingly, when the user logs in to a particular user account in order to submit the access control request, SDN controller 110 may receive (at 510) the access control request, and also the network address of the customer termination router or switch for that user or that particular user account. In some embodiments, SDN controller may detect network devices 120 in the user network path via traceroute and/or other network discovery. For instance, the particular user account may store a network address that is assigned to users of the particular user account for network access, and a traceroute of the network address may reveal network devices 120 in the network path.

In some embodiments, SDN controller 110 may select (at 535) between the one or more network devices 120 based on supported functionality and/or resource availability. A customer termination switch or router in the user home or office may not support time-of-day restrictions and/or other parameters of a generated rule because of software and/or hardware limitations. Accordingly, SDN controller 110 may select (at 535) a gateway router and/or another network device 120 that fully supports the rule generated by SDN controller 110.

Process 500 may include configuring (at 540) the generated one or more rules on the one or more selected network devices 120. SDN controller 110 may obtain the network address of each selected network device 120 via the user account or network discovery as described above. SDN controller 110 may connect to each selected network device 120. SDN controller 110 may use a master login and/or other security credentials to authorize access for modifying network device 120. SDN controller 110 may then program each selected network device 120 with the generated rule. In some embodiments, SDN controller 110 may program a network device 120 by providing a text, XML, or other file that includes the generated rule. In some embodiments, SDN controller 110 may program network devices 120 via the OpenFlow communications protocol or other SDN communication protocols. The OpenFlow communications protocol may provide SDN controller 110 with access to the forwarding plane of a connected network device 120, and SDN controller 110 can remotely manage and/or control packet matching rules and actions of the connected network device 120 via OpenFlow messaging. In some embodiments, each network device 120 may be configured with a domain name and/or network address for connecting to SDN controller 110. Accordingly, in some embodiments, a preexisting connection may exist between SDN controller 110 and network device 120, and SDN controller 110 may program network device 120 with newly generated rules and/or manage existing rules on network device 120 via the preexisting connection.

Since network addressing and/or other identifying characteristics for accessing one or more sites may change over time, process 500 may include periodically or intermittently performing (at 545) DNS queries and/or connecting to the sites to determine (at 550) if any network addressing and/or other identifying characteristics included in the rules generated by SDN controller 110 have changed. For instance, process 500 may perform the DNS queries according to a schedule (e.g., periodically), in response to some triggering condition (e.g., intermittently), and/or on some other basis. In some embodiments, SDN controller 110 may track a domain-name-to-network-address mapping for each generated rule, and may periodically perform (at 545) the DNS queries using the tracked domain names to determine (at 550) if any of the mappings has changed.

In response to detecting (at 550—Yes) that a network address or other identifying characteristic for a configured rule has changed, process 500 may include updating (at 555) the configured rule on one or more network devices 120 that are configured with that rule. In some embodiments, SDN controller 110 may instruct network device 120 to remove a previously configured rule, and to enforce a new rule with updated network addressing for the restricted sites and/or content. In response to detecting (at 550—No) that an address for a configured rule has not changed and/or after updating (at 555) one or more configured rules, process 500 may continue periodically performing (at 550) the DNS queries to ensure that the configured rules remain valid.

Figure 6:
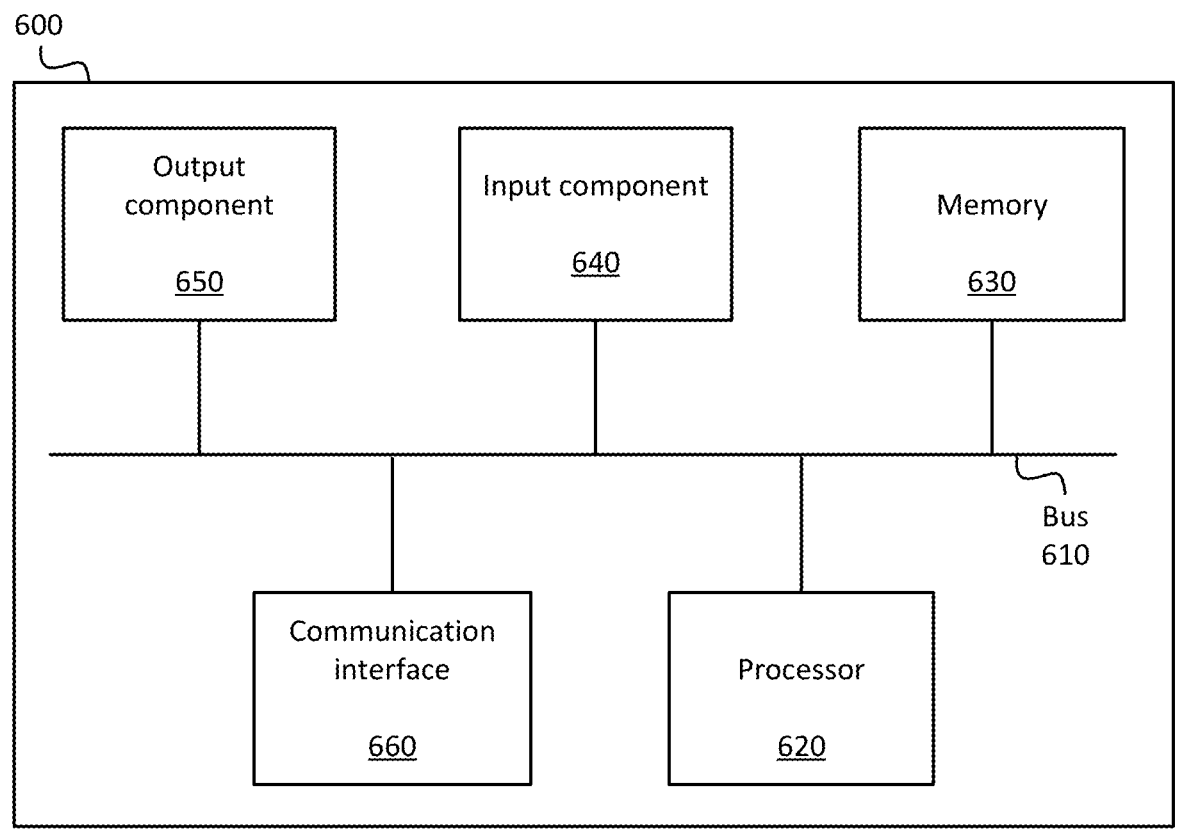
FIG. 6 illustrates example components of one or more devices, according to one or more embodiments described herein.

FIG. 6 is a diagram of example components of device 600. Device 600 may be used to implement one or more of the devices or systems described above (e.g., SDN controller 110, network device 120, UE 130, etc.). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For instance, the devices may be arranged according to different peer-to-peer, private, permissioned, and/or other blockchain networks.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of blocks and/or signals have been described with regard to FIGS. 1-5, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. For instance, SDN controller 110 may execute from a shared device that also performs various services and/or functionalities for a service provider. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device comprising:
a non-transitory computer-readable medium storing a set of processor-executable instructions; and
one or more processors configured to execute the set of processor-executable instructions, wherein executing the set of processor-executable instructions causes the one or more processors to:
receive a first access control request that specifies a first resource for which access, via a particular network, should be blocked when access is requested to the first resource via a first network access point associated with the particular network, the request including a first identifier of the first resource;
access a user account of a first user in response to receiving the first access control request from the first user;
receive a second access control request that specifies a second resource for which access, via the particular network, should be blocked when access is requested to the second resource via a second network access point associated with the particular network, the request including a second identifier of the second resource;
select a first network device, from a set of candidate network devices, to configure based on the first access control request, the selecting including determining that the first network device is in a first routing path between the first resource and the first network access point;
identify, from the user account, the first network device at the first network access point;
select a second network device, from the set of candidate network devices, to configure based on the second access control request, the selecting including determining that the second network device is in a second routing path between the second resource and the second network access point;
configure the first network device with a first rule that is based on the first access control request, wherein the first network device, in response to being configured with the first rule, blocks a first set of User Equipment ("UEs"), that access the network via the first network access point, from accessing the first resource while permitting the first set of UEs access to at least the second resource; and
configure the second network device with a second rule that is based on the second access control request, wherein the second network device, in response to being configured with the second rule, blocks a second set of UEs, that access the network via the second network access point, from accessing the second resource while permitting the second set of UEs access to at least the first resource.

2. The device of claim 1, wherein the processor-executable instructions further include processor-executable instructions to:
perform a Domain Name System ("DNS") query based on the first identifier; and
resolve the first identifier into a network address that is used to access the first resource.

3. The device of claim 2, wherein the processor-executable instructions further include processor-executable instructions to:
generate the first rule based on the network address.

4. The device of claim 2, wherein the processor-executable instructions further include processor-executable instructions to:
establish a connection with the first resource;
obtain at least one parameter uniquely identifying a restricted first site or restricted first content at the first resource based on one or more packets exchanged over the connection with the first resource; and generate the first rule based on the at least one parameter.

5. The device of claim 1, wherein the processor-executable instructions further include processor-executable instructions to:

resolve the first identifier into a first network address of the first resource;

generate the first rule based on the first network address;

determine that the first identifier resolves to a different second network address after configuring the first network device with the first rule; and reconfigure the first network device with a third rule in place of the first rule, wherein the first network device, in response to being configured with the third rule, blocks the first set of UEs from accessing the first resource while permitting the first set of UEs access to at least the second resource.

6. The device of claim 1, wherein the processor-executable instructions further include processor-executable instructions to:

determine at least a first network address associated with the first set of UEs; and generate the first rule with a source address set to at least the first network address, wherein the first network device configured with the source address of the first rule set to at least the first network address blocks the first set of UEs from accessing the first resource while permitting the first set of UEs access to at least the second resource.

7. The device of claim 1, wherein first resource comprises one or more of:

a server that is accessed used the first identifier, a site that is hosted by the server, or content that is distributed by the server.

8. The device of claim 1, wherein the processor-executable instructions further include processor-executable instructions to:

establish a connection with the first resource;

monitor at least one identifying characteristic of content that is accessible from the first resource; and modify the first rule based on a change to the identifying characteristic that is detected from the monitoring.

9. A non-transitory computer-readable medium, storing a set of processor-executable instructions, which, when executed by one or more processors, cause the one or more processors to:

receive a first access control request that specifies a first resource for which access, via a particular network, should be blocked when access is requested to the first resource via a first network access point associated with the particular network, the request including a first identifier of the first resource;

access a user account of a first user in response to receiving the first access control request from the first user;

receive a second access control request that specifies a second resource for which access, via the particular network, should be blocked when access is requested to the second resource via a second network access point associated with the particular network, the request including a second identifier of the second resource;

select a first network device, from a set of candidate network devices, to configure based on the first access control request, the selecting including determining that the first network device is in a first routing path between the first resource and the first network access point;

identify, from the user account, the first network device at the first network access point;

select a second network device, from the set of candidate network devices, to configure based on the second access control request, the selecting including determining that the second network device is in a second routing path between the second resource and the second network access point;

configure the first network device with a first rule that is based on the first access control request, wherein the first network device, in response to being configured with the first rule, blocks a first set of User Equipment ("UEs"), that access the network via the first network access point, from accessing the first resource while permitting the first set of UEs access to at least the second resource; and configure the second network device with a second rule that is based on the second access control request, wherein the second network device, in response to being configured with the second rule, blocks a second set of UEs, that access the network via the second network access point, from accessing the second resource while permitting the second set of UEs access to at least the first resource.

10. The non-transitory computer-readable medium of claim 9, wherein the processor-executable instructions further include processor-executable instructions to:

perform a Domain Name System ("DNS") query based on the first identifier; and resolve the first identifier into a network address that is used to access the first resource.

11. The non-transitory computer-readable medium of claim 10, wherein the processor-executable instructions further include processor-executable instructions to:

generate the first rule based on the network address.

12. The non-transitory computer-readable medium of claim 9, wherein the processor-executable instructions further include processor-executable instructions to:

establish a connection with the first resource;

obtain at least one parameter uniquely identifying a restricted first site or restricted first content at the first resource based on one or more packets exchanged over the connection with the first resource; and generate the first rule based on the at least one parameter.

13. The non-transitory computer-readable medium of claim 9, wherein the processor-executable instructions further include processor-executable instructions to:

resolve the first identifier into a first network address of the first resource;

generate the first rule based on the first network address;

determine that the first identifier resolves to a different second network address after configuring the first network device with the first rule; and reconfigure the first network device with a third rule in place of the first rule, wherein the first network device, in response to being configured with the third rule, blocks the first set of UEs from accessing the first resource while permitting the first set of UEs access to at least the second resource.

14. A method comprising:

receiving a first access control request that specifies a first resource for which access, via a particular network, should be blocked when access is requested to the first resource via a first network access point associated with the particular network, the request including a first identifier of the first resource;

accessing a user account of a first user in response to receiving the first access control request from the first user;

receiving a second access control request that specifies a second resource for which access, via the particular network, should be blocked when access is requested to the second resource via a second network access point associated with the particular network, the request including a second identifier of the second resource;

selecting a first network device, from a set of candidate network devices, to configure based on the first access control request, the selecting including determining that the first network device is in a first routing path between the first resource and the first network access point;

identifying, from the user account, the first network device at the first network access point;

selecting a second network device, from the set of candidate network devices, to configure based on the second access control request, the selecting including determining that the second network device is in a second routing path between the second resource and the second network access point;

configuring the first network device with a first rule that is based on the first access control request, wherein the first network device, in response to being configured with the first rule, blocks a first set of User Equipment ("UEs"), that access the network via the first network access point, from accessing the first resource while permitting the first set of UEs access to at least the second resource; and configuring the second network device with a second rule that is based on the second access control request, wherein the second network device, in response to being configured with the second rule, blocks a second set of UEs, that access the network via the second network access point, from accessing the second resource while permitting the second set of UEs access to at least the first resource.

15. The method of claim 14, further comprising:
performing a Domain Name System ("DNS") query based on the first identifier;
resolving the first identifier into a network address that is used to access the first resource; and
generating the first rule based on the network address.

16. The method of claim 14, further comprising:
establishing a connection with the first resource;
obtaining at least one parameter uniquely identifying a restricted first site or restricted first content at the first resource based on one or more packets exchanged over the connection with the first resource; and
generating the first rule based on the at least one parameter.

17. The method of claim 14, further comprising:
resolving the first identifier into a first network address of the first resource;
generating the first rule based on the first network address;
determining that the first identifier resolves to a different second network address after configuring the first network device with the first rule; and
reconfiguring the first network device with a third rule in place of the first rule, wherein the first network device, in response to being configured with the third rule, blocks the first set of UEs from accessing the first resource while permitting the first set of UEs access to at least the second resource.

18. The method of claim 14, further comprising:
determining at least a first network address associated with the first set of UEs; and
generating the first rule with a source address set to at least the first network address, wherein the first network device configured with the source address of the first rule set to at least the first network address blocks the first set of UEs from accessing the first resource while permitting the first set of UEs access to at least the second resource.

19. The method of claim 14, further comprising:
monitoring at least one identifying characteristic of content that is accessible from the first resource;
detecting a change to the identifying characteristic based on the monitoring; and
modifying the first rule based on the detected change to the identifying characteristic.

20. The method of claim 19, wherein the detected change to the identifying characteristic includes a change to a network address associated with the content that is accessible from the first resource.

* * * * *